US011358526B2

(12) United States Patent
Ziethén et al.

(10) Patent No.: US 11,358,526 B2
(45) Date of Patent: Jun. 14, 2022

(54) AUTOMATIC PANNING SYSTEM

(71) Applicant: Stoneridge Electronics AB, Solna (SE)

(72) Inventors: Andreas Ziethén, Stockholm (SE); Erik Sundkvist, Norrtälje (SE)

(73) Assignee: STONERIDGE ELECTRONICS AB, Solna (SE)

( * ) Notice: Subject to any disclaimer, the term of this patent is extended or adjusted under 35 U.S.C. 154(b) by 162 days.

(21) Appl. No.: 16/351,717

(22) Filed: Mar. 13, 2019

(65) Prior Publication Data

US 2019/0344716 A1 Nov. 14, 2019

Related U.S. Application Data

(63) Continuation of application No. PCT/SE2017/050900, filed on Sep. 13, 2017.

(30) Foreign Application Priority Data

Sep. 13, 2016 (SE) .................................... 1651228-7
Oct. 3, 2016 (SE) .................................... 1651297-2

(51) Int. Cl.
*B60R 1/00* (2006.01)

(52) U.S. Cl.
CPC .......... *B60R 1/002* (2013.01); *B60R 2300/30* (2013.01); *B60R 2300/80* (2013.01)

(58) Field of Classification Search
CPC ........ B60R 1/002; B60R 1/003; B60R 1/006; B60R 1/02; B60R 1/025
USPC ........................................................ 348/148
See application file for complete search history.

(56) References Cited

U.S. PATENT DOCUMENTS

| 5,274,432 | A | * | 12/1993 | Parent ....................... B60R 1/00 |
| | | | | 33/264 |
| 6,390,631 | B1 | | 5/2002 | Heinrich et al. |
| 6,690,413 | B1 | | 2/2004 | Moore |
| 9,610,975 | B1 | * | 4/2017 | Hu .......................... B62D 13/06 |
| 10,140,525 | B2 | * | 11/2018 | Lang ......................... B60R 1/00 |
| 10,701,300 | B2 | * | 6/2020 | Greenwood ....... H04N 5/23238 |
| 2001/0024333 | A1 | | 9/2001 | Rost |
| 2003/0025791 | A1 | | 2/2003 | Kenneth |
| 2004/0215374 | A1 | | 10/2004 | Shepard |
| 2008/0044061 | A1 | | 2/2008 | Hongo |
| 2008/0231701 | A1 | | 9/2008 | Greenwood et al. |
| 2010/0039721 | A1 | | 2/2010 | Lee et al. |
| 2012/0271512 | A1 | | 10/2012 | Rupp et al. |

(Continued)

FOREIGN PATENT DOCUMENTS

| DE | 10037128 A1 | 5/2001 |
| DE | 102008035428 A1 | 2/2010 |

(Continued)

*Primary Examiner* — Nathnael Aynalem
(74) *Attorney, Agent, or Firm* — Gabriela B. Tomescu, Esq.; Bergenstrahle & Partners AB

(57) ABSTRACT

An automatic panning system and method adapted for a vehicle with an attached trailer. The automatic panning system comprises an image capturing means adapted to capture image data with a view of the trailer and the automatic panning system is adapted to analyze the image data to identify at least one elongated element of the trailer, project a vector in the image data based on said elongated element, establish at least one reference vector, and identify an interception point of the reference vector and said projected vector.

23 Claims, 6 Drawing Sheets

(56) References Cited

U.S. PATENT DOCUMENTS

| | | |
|---|---|---|
| 2013/0038734 A1* | 2/2013 | Furukawa ........ H04N 5/232945 |
| | | 348/148 |
| 2014/0085472 A1 | 3/2014 | Lu et al. |
| 2014/0160276 A1 | 6/2014 | Pliefke |
| 2014/0267688 A1 | 9/2014 | Aich et al. |
| 2014/0330487 A1 | 11/2014 | Brandt et al. |
| 2014/0358424 A1 | 12/2014 | Lavoie et al. |
| 2015/0002670 A1 | 1/2015 | Bajpai |
| 2015/0022664 A1 | 1/2015 | Pflug et al. |
| 2016/0049020 A1 | 2/2016 | Kuehnle et al. |
| 2016/0167583 A1 | 6/2016 | Schrepfer |
| 2016/0314357 A1 | 10/2016 | Fey et al. |
| 2017/0320519 A1 | 11/2017 | Boos |

FOREIGN PATENT DOCUMENTS

| | | |
|---|---|---|
| DE | 102010006323 A1 | 8/2011 |
| DE | 102010032411 A1 | 2/2012 |
| DE | 102011113197 A1 | 3/2013 |
| DE | 102013009894 A1 | 12/2013 |
| EP | 2272691 A1 | 1/2011 |
| EP | 3029929 A1 | 6/2016 |
| GB | 2356612 A | 5/2001 |
| GB | 2447672 A | 9/2008 |
| WO | 2013079068 A1 | 6/2013 |

\* cited by examiner

AUTOMATIC PANNING SYSTEM

This application is the continuation of International Application No. PCT/SE2017/050900, filed 13 Sep. 2017, which claims the benefit of Swedish Patent Application No. SE 1651228-7, filed 13 Sep. 2016, and Swedish Patent Application No. SE 1651297-2, filed 3 Oct. 2016, the entire contents of which are hereby incorporated by reference.

TECHNICAL FIELD

The present invention relates generally to a panning system for panning a rear view image in a vehicle.

BACKGROUND ART

In prior art it is known to provide solutions for enhancing the rear view visibility for a vehicle driver. Solutions are known for different vehicles, one example is a truck with a trailer. Conventional rear view mirrors and side mirrors wherein the reflection is used to present a rear view has been used in the art for a long time and for example features that the mirrors can be manually adjusted by the driver. In addition to adjusting the mirror the driver has the possibility to move the perspective of the mirror through moving around in relation to the mirror. This is often done through the driver moving his head and results in that different portions of the area behind the vehicle become visible.

Arranging one or more cameras, either as a complement or to replace the conventional rear view mirrors, is well known. The cameras are adapted to show a rear view in relation to the vehicle and such solutions has in the art previously been utilized both for rear view cameras and electronic rear view mirrors.

For electronic rear view mirrors and reverse cameras the prior art further presents systems enabling that the image is panned. Panning means that the camera or image can be adjusted to show different portions of the section behind the vehicle in a similar way as the user achieves through moving his head in relation to a mirror in the conventional rear view mirror systems. However, the systems of the prior art comprises multiple drawbacks, especially for vehicles that tow a trailer. When a vehicle with an attached trailer turns the trailer will obstruct the view of the rear view mirror making it difficult for the driver to see how the trailer moves. This is a problem present both in traditional mirror systems and in prior art rear view systems utilizing cameras.

SUMMARY OF INVENTION

As discussed it is a problem with rear view mirrors, side view mirrors, and rear view cameras based on image capturing from a device, such as a camera, that the user's perspective angle in relation to the mirror don't affect the image displayed from the camera. In a traditional reflective mirror the driver can move his head to control the field of view. In a display system this is not possible since the angle of the users head won't affect the display angle. To achieve the same field of view the displayed image either needs to constantly display much more of the surrounding area than a traditional mirror or it needs to be panned. Solutions displaying more information can be beneficial in some embodiments but at the same time results in resolutions of the image that makes it difficult for the operator to distinguish smaller objects.

Panning systems are therefore a good alternative and there are many ways of performing panning. One solutions is to use object recognition in an image recorded by an image capturing device, store the position of a specific object in the image data and pan the image through making sure that the identified object always is in the same relative position in the panned image data displayed to the user.

The panning can be achieved either through physically moving the angle of the image capturing means or having an image capturing means constantly capturing image data of a larger area than displayed to the user. The latter instead crops the image data into the correct section in order to display the most useful information.

The operation of panning an image presents multiple problems in relation to how the panning operation is performed. In order to provide a good user experience and replace traditional mirrors it is important that the image data is panned in a natural way with a consistent result. One option as present in prior art is that the user manually can control the panning in a way similar to adjusting a traditional rear view mirror. This adds an additional task to maneuvering of the vehicle resulting in a solution that is difficult and inconvenient for the user to use.

Automatic panning can be conducted in different ways as realized by the inventors. However, most solutions evaluated by the inventor suffer from drawbacks that are similar to the manual panning. For example, it is possible to conduct panning through recognizing a specific feature of a towed object, such as a trailer, in an image. The recognized object can be a logo, indicator, or any other form of object that is identifiable in an image somewhere at the towed object. Through analyzing the images captured during operation the relative position of the recognized object in the image can be identified. Based on the relative position of an object the panning operation can thereby be controlled through panning the image maintaining the recognized object in the same relative position at all times. This solution solves some of the problems of the prior art but has multiple drawbacks especially in relation to how the image panning works. The image panning isn't dependent on a point located at any specific location of the trailer and can with different towing objects be placed at different places along the length and height of the towing object. This provides a solution wherein the rotating axis of the panning might not correspond to how the towing object actually moves and thereby provide an unnatural and distorted panning experience for the user. Furthermore, such solutions can present different results at different times causing confusion for the vehicle operator.

There are additional drawbacks with solutions depending on locating objects in an image relating to required processing power. Conducting such operations in real-time requires large calculation capacity from the device conducting the operation and there is a risk for delays in the system.

It is thereby one object of the present solution to provide a natural and undistorted panning operation that presents consistent results to the user.

Another object of the present solution is to provide a solution requiring less computer power.

Another object of the present solution is to provide side view mirrors enabling a better overview for the user than conventional side view mirrors.

Another object of the present solution is to display useful information to the driver without compromising attention to traffic.

Thus, the solution relates to an automatic panning system adapted for a vehicle with an attached trailer, wherein said automatic panning system comprises an image capturing means adapted to capture image data with a view of the trailer. The automatic panning system is adapted to analyze the image data to identify at least one elongated element of the trailer, project a vector in the image data based on said elongated element, establish at least one reference vector, and identify an interception point of the reference vector and said projected vector.

The automatic panning system herein relates to panning for image data corresponding to data from side view mirrors (also in the art called fender mirrors, door mirrors, or wing mirrors), but could as understood by the person skilled in the art also be implemented in a rear view mirror or in relation to a rear view camera.

Through identifying an elongated element, such as the lower edge of the trailer or an elongated part of a print on the trailer, it is possible to conduct calculations without constantly analyzing the images in the same way as required when conducting panning with a system as previously described. The elongated element is used to project a vector that can be compared with the established reference vector resulting in an interception point. This is advantageous both since the interception point provides a consistent point in relation to the length of the trailer to pan the image data from but also from that the calculations aims to find an interception between the projected vector and a reference vector instead of constantly analyzing an object.

The interception point corresponds to a point in the close vicinity of an end point of the trailer making the panning operation consistent and accurate independent of the size, shape, form, and characteristics of trailer that is attached to the vehicle.

As previously described it is a problem with prior art solutions that automatic panning functions differently depending on where the rotation axis for the trailer is located in relation to the point the panning system uses to pan the image. Through calculating the position of the rear end of the trailer instead of identifying merely an object based on object recognition it is possible to solve this problem, as will be further described herein.

According to one embodiment the projected vector can be projected at a constant offset along the identified elongated element.

According to one embodiment the projected vector is a tangent of the elongated element.

According to one embodiment the panning speed is adjusted to provide a smoother experience.

A smother panning can be achieved through adjusting the speed the panning is performed at, this has the effect that a more natural experience is achieved.

According to one embodiment of the automatic panning system adapted for a vehicle with an attached trailer, wherein said automatic panning system comprises an image capturing means adapted to capture image data with a view of the trailer. The automatic panning system is adapted to analyze the image data to identify at least one elongated element of the trailer, project a vector in the image data based on said elongated element, establish at least one horizontal reference, and identify an interception point of the horizontal reference and said projected vector.

It is one advantage with the present solution that a horizontal reference in the form of a reference vector can be established in the image data. The horizontal reference is in one embodiment based on information available in the background, such as the horizon or any other substantially flat object that can be identified and used to project a reference vector.

According to one embodiment the automatic panning system is further adapted to establish the horizontal reference such that said identified interception point corresponds to the position of the rear end of the trailer in the captured image data.

It is one advantage with the present solution that the rear end of the trailer can be identified through the interception point between the vectors. This solution enables an enhanced automatic panning.

According to one embodiment the automatic panning system further is adapted to pan the captured image data based on the identified interception point.

According to one embodiment the automatic panning system further is adapted to, in real time, present the panned captured image data to an operator of the vehicle.

According to one embodiment the identified elongated element is selected from any one of the longitudinal lower edge of the trailer, the longitudinal top edge of the trailer, the vertical rear edge of the trailer, and a printed element on the trailer side.

According to one embodiment the reference vector is determined based on at least one distinct point in the background of the captured image data.

The reference vector is in one embodiment calculated based on edge detection in the background of the image data.

According to one embodiment a continuous panning that isn't shown to the user of the vehicle is performed creating, from fixed objects in the background, as well as the horizon, information about objects that don't change in a vertical direction. Based on such objects the reference vector is established to create a panning that don't change in the vertical direction.

According to one embodiment the reference vector is a horizontal reference vector.

According to one embodiment the automatic panning system further comprises a display, a memory, and a processor unit.

According to one embodiment the image capturing means is arranged on top of the vehicle towing the trailer.

According to one embodiment the image capturing means is arranged at a height corresponding to at least 80% of the trailer height.

According to one embodiment the image capturing means is arranged at the same spot as a rear view mirror normally is arranged.

According to one embodiment the image capturing means is arranged together with a side mirror.

According to one embodiment the image capturing means is arranged instead of a side mirror.

According to one embodiment the image capturing means is arranged at the same spot as a side mirror normally is arranged.

According to one embodiment the system is further adapted identify a further interception point on the opposite side of the trailer from the interception point, establish if the further interception point is in a position that based on at least one of the physical properties of the trailer, the previous position of the trailer, and the interception point is possible.

It is one advantage that through utilizing the embodiment wherein interception points are identified on both sides of the trailer through analyzing image data. The image data is analyzed to identify at least one elongated element of the trailer on each side. On each side a vector is projected in the image data for based on the elongated element. The system is further adapted to establish at least one reference vector for each side and identify an interception point where the reference vectors and projected vectors for each side cross. This can be used to determine if there is any unexpected or unreasonable readings in relation to the trailer movement through analyzing how the interception points move, i.e. if the interception point is possible or not. Thereby the solution can be used to decrease the number of errors making the panning more accurate.

According to one embodiment the further interception point is used to remove error results.

According to one embodiment information about the trailer position is calculated from at least one interception point.

According to one embodiment the trailer position is recorded to a memory enabling that the automatic panning system knows the latest position of the trailer.

It is one advantage with the present solution that the automatic panning system knows the latest position of the trailer. In one embodiment the latest position of the trailer is used when the system is rebooted, for example when the vehicle is started, as an initial position of the trailer.

According to one embodiment the automatic panning system is adapted to analyze, based on at least one interception point, if the trailer is moving in a natural and/or predictable way.

It is one advantage that results that are not relevant or error results can be filtered from the solution creating a better panning experience.

According to one embodiment the automatic panning system further is adapted to calculate the vehicle speed as a function of the velocity and angle of the wheels to predict a trailer movement.

According to one embodiment, the automatic panning system is adapted to analyze the image data to estimate the trailer's angle using the image capturing means and predict the trailer's rotational derivative, in particular the derivative of the trailer's angle, using derivate calculation parameters comprising at least one of the length of the trailer, the trailer's hitching offset, the distance between the vehicles wheel axles, the vehicle's speed, and the steering wheel angle of the vehicle, and in that the automatic panning system further is adapted to use the trailer's angle and the calculated derivative to predict a future trailer angle.

According to one embodiment, the automatic panning system is adapted to analyze the image data to estimate the trailer's angle using the image capturing means and predict the trailer's rotational derivative, in particular the derivative of the trailer's angle, using derivative calculation parameters comprising the distance between the wheels of the trailer, the distance between the wheels and the hitching point, the steering angle of the front wheels and/or the steering wheel angle, and the speed of the vehicle, and in that the automatic panning system further is adapted to use the trailer's angle and the calculated derivative to predict a future trailer angle.

According to one embodiment an automatic panning system adapted for a vehicle with an attached trailer is provided, wherein said automatic panning system comprises an image capturing means adapted to capture image data with a view of the trailer, characterized in that the automatic panning system is adapted to analyze the image data to estimate the trailer's angle using the image capturing means and predict the trailer's rotational derivative, in particular the derivative of the trailer's angle, using derivative calculation parameters comprising at least one of the length of the trailer, the trailer's hitching offset, the distance between the vehicles wheel axles, the vehicle's speed, and the steering wheel angle of the vehicle, and in that the automatic panning system further is adapted to use the trailer's angle and the calculated derivative to predict a future trailer angle.

According to one embodiment, an automatic panning system adapted for a vehicle with an attached trailer is provided, wherein said automatic panning system comprises an image capturing means adapted to capture image data with a view of the trailer, characterized in that the automatic panning system is adapted to analyze the image data to estimate the trailer's angle using the image capturing means and predict the trailer's rotational derivative, in particular the derivative of the trailer's angle, using derivative calculation parameters comprising the distance between the wheels of the trailer, the distance between the wheels and the hitching point, the steering angle of the front wheels and/or the steering wheel angle, and the speed of the vehicle, and in that the automatic panning system further is adapted to use the trailer's angle and the calculated derivative to predict a future trailer angle.

According to one embodiment the automatic panning system further is adapted to identify at least one elongated element of the trailer, project a vector in the image data based on said elongated element, establish at least one reference vector, and identify an interception point of the reference vector and said projected vector.

According to one embodiment, the automatic panning system is further adapted to calculate an imagined cone having its center at the predicted trailer angle of the trailer.

According to one embodiment, the automatic panning system is adapted to calculate an imagined cone and to determine the width of the cone based on the derivative calculation parameters.

According to one embodiment, the automatic panning system is further adapted to discard interception points outside the imagined cone.

According to one aspect in an automatic panning system adapted to be arranged in a vehicle with an attached trailer, wherein said automatic panning system is configured to capture image data comprising the trailer attached to the vehicle, the method comprises the steps:

capturing image data, analyzing the image data to identify at least one elongated element of the trailer, establishing at least one horizontal reference, projecting a vector of the identified elongated element, and identifying an interception point between the projected vector based on the elongated element and the horizontal reference line.

According to one embodiment the horizontal reference is established such that said interception point corresponds to the position of the rear end of the trailer in the captured image data.

According to one embodiment in an automatic panning system the following step is performed:

panning said captured imaged data based on the interception point.

According to one embodiment the elongated element is selected from any one of the longitudinal lower edge of the trailer, the longitudinal top edge of the trailer, the vertical rear edge of the trailer, and a printed element on the trailer side.

According to one embodiment the horizontal reference is a horizontal reference line.

According to one embodiment the horizontal reference is determined based on at least one distinct point in the background of the captured image data.

According to one embodiment the horizontal reference is a horizontal vector.

According to one embodiment the solution further comprises the steps:

determining the speed of the vehicle, determining the processing time for capturing and analyzing image data, determining a processing time threshold based on said speed of the vehicle, if said threshold is exceeded, and panning the captured image data based on vehicle sensor data.

It is one advantage with the present solution that for different travel modes, such as different speeds, different travel directions (reverse or forward) the automatic panning system in one embodiment use different algorithms to pan the image. This has the effect that solution that works well in low speeds that at high speeds might be too slow to create a smooth experience can be combined with solution that are quick but not as accurate. Those solution presents better accuracy, for example in high speed travel in a forward direction relating to the vehicle's travel direction.

According to one embodiment, the method further comprises the steps:

estimating the trailer's angle using the image capturing means and predicting the trailer's rotational derivative, in particular the derivative of the trailer's angle, using derivative calculation parameters comprising at least one of the length of the trailer, the trailer's hitching offset, the distance between the vehicles wheel axles, the vehicles speed, and the steering wheel angle of the vehicle, and using the trailer's angle and the calculated derivative to predict a future trailer angle.

The According to one embodiment, the method further comprises the steps:

estimating the trailer's angle using the image capturing means and predicting the trailer's rotational derivative, in particular the derivative of the trailer's angle, using derivative calculation parameters comprising the distance between the wheels of the trailer, the distance between the wheels and the hitching point, the steering angle of the front wheels and/or the steering wheel angle, and the speed of the vehicle, and using the trailer's angle and the calculated derivative to predict a future trailer angle.

According to one embodiment, a method in an automatic panning system adapted to be arranged in a vehicle with an attached trailer is provided, wherein said automatic panning system is configured to capture image data with a view of the trailer attached to the vehicle, the method comprises the steps:

capturing image data, estimating the trailer's angle using the image capturing means and predicting the trailer's rotational derivative, in particular the derivative of the trailer's angle, using derivative calculation parameters comprising at least one of the length of the trailer, the trailer's hitching offset, the distance between the vehicles wheel axles, the vehicles speed, and the steering wheel angle of the vehicle, and using the trailer's angle and the calculated derivative to predict a future trailer angle.

According to one embodiment, a method in an automatic panning system adapted to be arranged in a vehicle with an attached trailer is provided, wherein said automatic panning system is configured to capture image data with a view of the trailer attached to the vehicle, the method comprises the steps:

capturing image data, estimating the trailer's angle using the image capturing means and predicting the trailer's rotational derivative, in particular the derivative of the trailer's angle, using derivative calculation parameters comprising the distance between the wheels of the trailer, the distance between the wheels and the hitching point, the steering angle of the front wheels and/or the steering wheel angle, and the speed of the vehicle, and using the trailer's angle and the calculated derivative to predict a future trailer angle.

According to one embodiment, the method further comprises the steps:

analyzing the image data to identify at least one elongated element of the trailer, establishing at least one horizontal reference, projecting a vector of the identified elongated element, and identifying an interception point between the projected vector based on the elongated element and the horizontal reference line.

According to one embodiment, the method further comprising the steps:

calculating an imagined cone having its center at the predicted trailer angle of the trailer According to one embodiment, the method further comprising the steps:

calculating a width of the cone determined based on the derivative calculation parameters.

According to one embodiment, the method further comprising the steps:

discarding interception points outside the imagined cone.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the solution is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the automatic panning system.

Briefly, the solution relates to an automatic panning system for enhancing automatic panning in a rear view system of a vehicle with a trailer. The system focus on finding an interception point between a projected vector based on an elongated element of the trailer and a reference vector based on for example the horizon.

Figure 1:
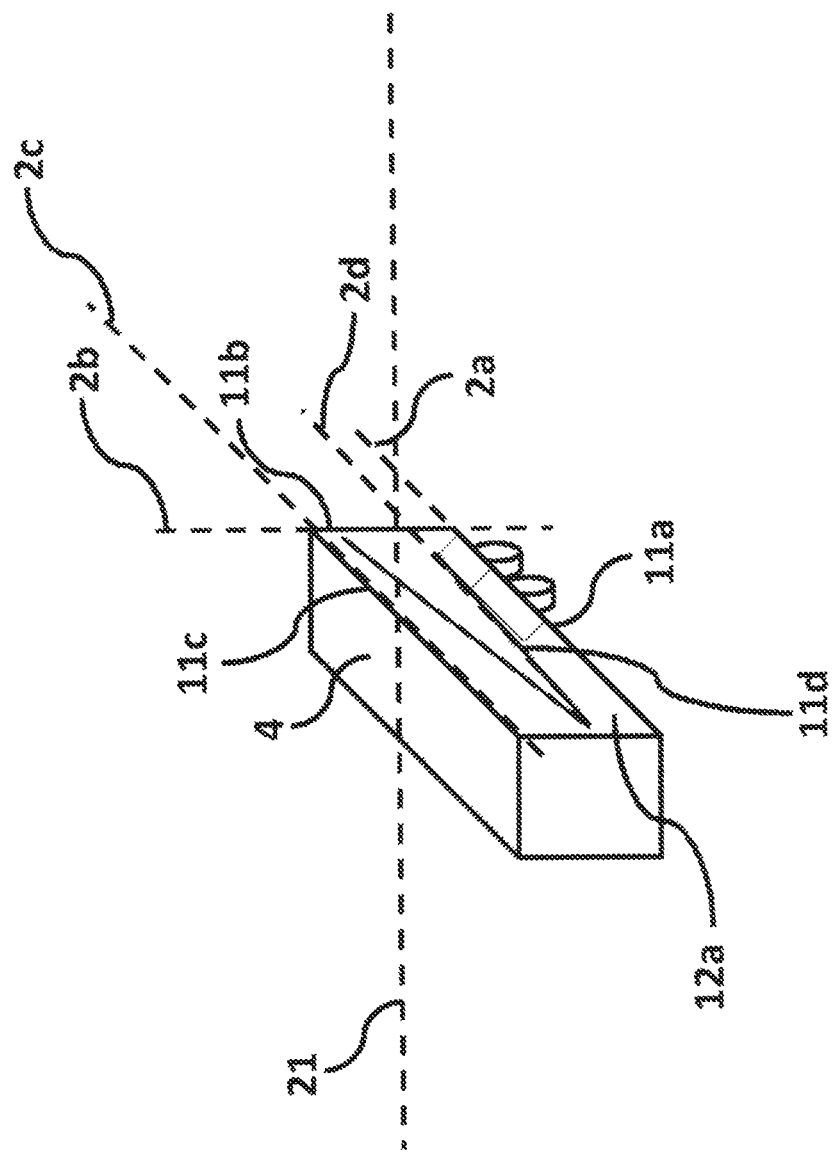
FIG. 1 illustrates an illustrative view of a trailer wherein multiple possible vectors have been projected.

FIG. 1 shows an illustrative view of a trailer 4 adapted to be towed behind a vehicle (not shown). The trailer comprises a number of elongated elements 11a, 11b, 11c, 11d that is possible for an image capturing means such as a rear facing camera (not shown) to capture. The rear facing camera is in one embodiment arranged in the upper section of the height of the vehicle towing the trailer in order to capture a good perspective for the image data with a view of the trailer 4. The elongated elements 11a, 11b, 11c, 11d can be any form of elongated element such as a trailer edge. The trailer edges can be used to project a vector in a direction enabling the system to, in combination with a reference vector 21, identify how long the trailer 4 is, or where the end of the trailer 4 currently is located.

FIG. 1 further illustrates how different elongated elements 11a, 11b, 11c, 11d can be used to project vectors 2a, 2b, 2c, 2d that extend outside the perimeters of the trailer 4. The vectors 2a, 2b, 2c, 2d can be used to determine an interception point with a reference vector 21. It should further be noted that each of the vectors 2a, 2b, 2c, 2d in one embodiment can be used as a reference vector 21 to identify an interception point between the vectors.

As illustrated in FIG. 1 the trailer 4 further comprises a visible side 12a that is part of the view in the captured image data.

Figure 2:
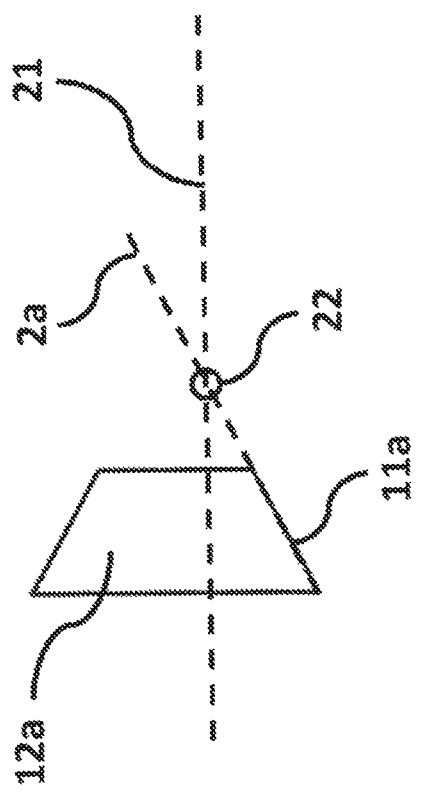
FIG. 2 illustrates one embodiment of an automatic panning system wherein an interception point between a projected vector and a reference vector has been detected.

FIG. 2 illustrates an illustrative view of captured image data with a view of the trailer 4, here illustrated as a view of the visible side 12a. In the embodiment as illustrated in FIG. 2 a reference vector 21 has been established in the image data as a horizontal reference vector 21 that intersects the projected vector 2a in the interception point 22. The interception point 22 is in the close vicinity of the position where the trailer ends and thereby in one embodiment provides a good point for panning the image data in relation to.

Figure 3:
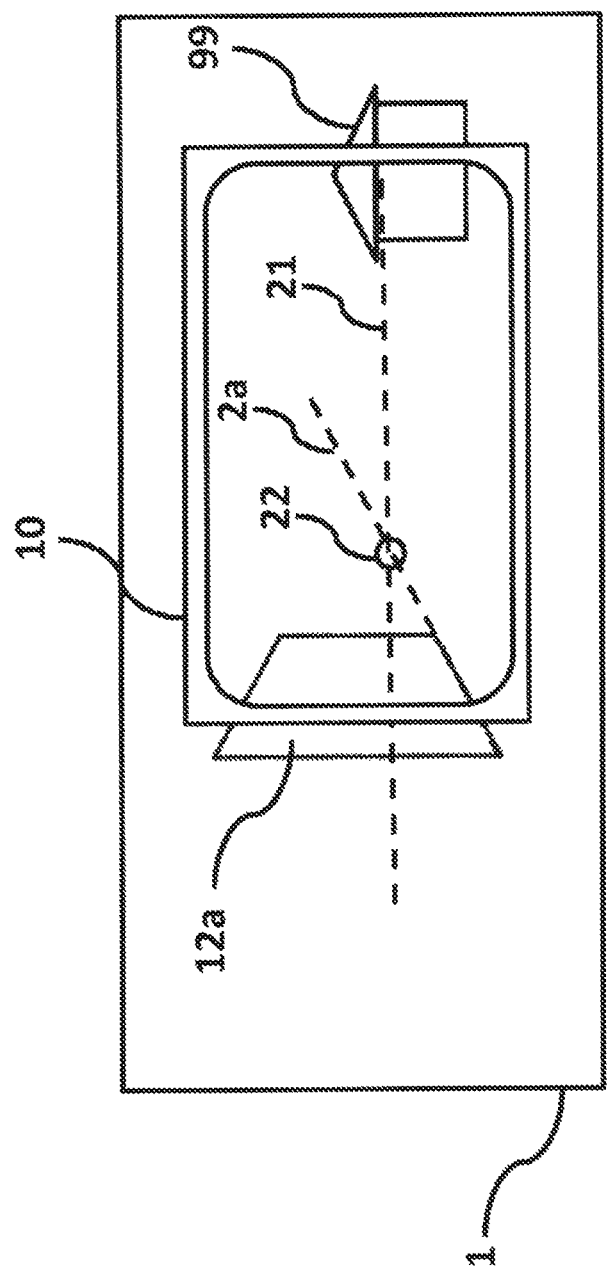
FIG. 3 illustrates one embodiment of image data and panned image data wherein the panned image data is based on an identified interception point.

FIG. 3 illustrates captured image data 1 in an automatic panning system wherein a panning operation already has been conducted and the user sees panned image data 10 on for example a screen located in the driver area of the vehicle towing the trailer 4. As can be seen in the panned image data 10 as illustrated in FIG. 3 the visible side 12a of the trailer 4 is located to the left and the user can see other objects 99 located in the vicinity of the trailer 4. The projected vector 2a, the reference vector 21, and the interception point 22 is only illustrated for illustrative purposes and is in one embodiment not shown in the panned image data 10. FIG. 3 further illustrates the concept of the interception point 22 and how the panned image data 10 moves within the image data 1 as the interception point 22 moves due to that the trailer 4 turns in relation to the towing vehicle.

Figure 4:
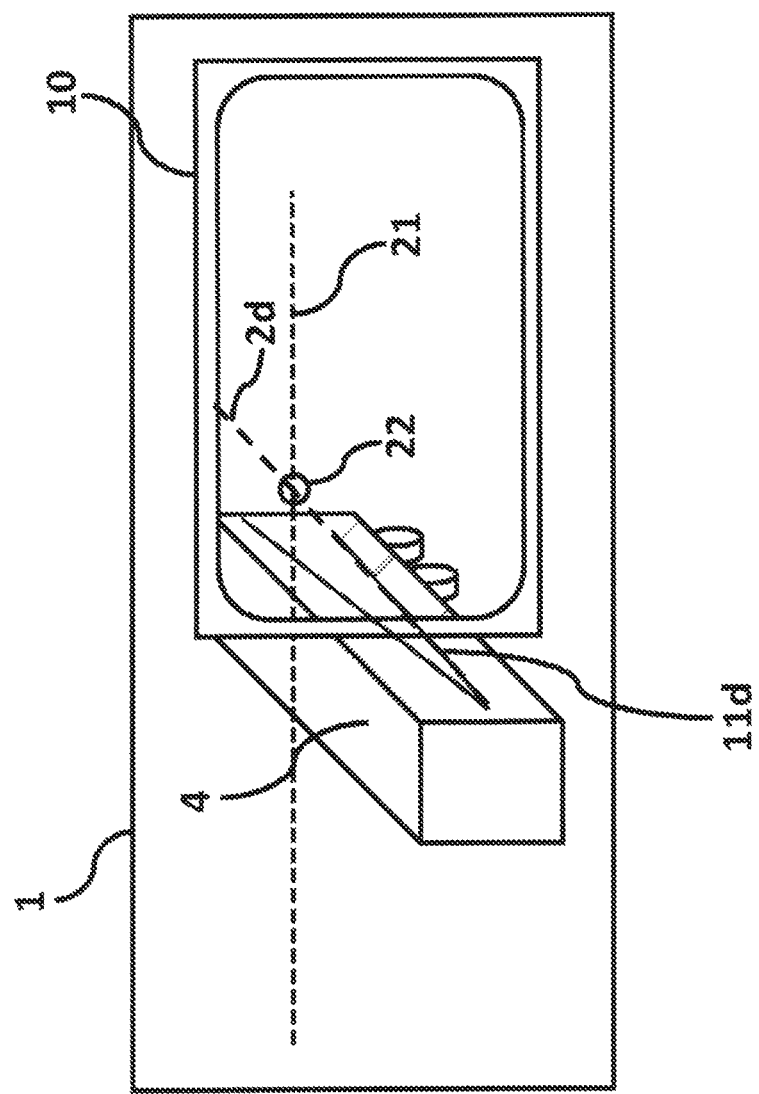
FIG. 4 illustrates another embodiment of image data and panned image data wherein the panned image data is based on an identified interception point.

FIG. 4 illustrates another embodiment wherein an elongated element 11d on the trailer side has been identified instead of the lower edge of the trailer as illustrated in FIG. 3. FIG. 4 thereby illustrates another embodiment wherein an interception point 22 has been identified between a projected vector 2d and a reference vector 21.

Figure 5:
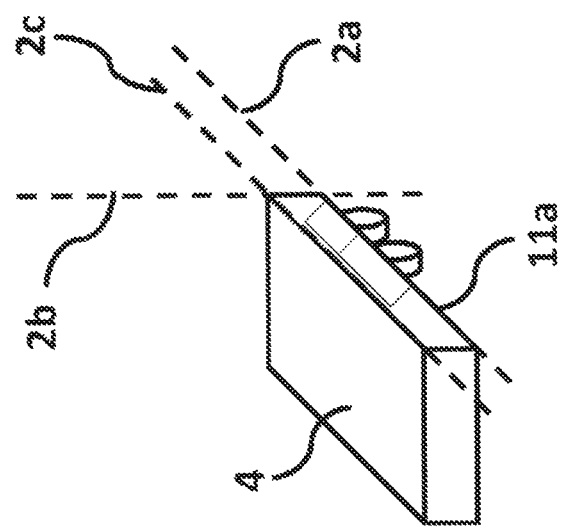
FIG. 5 illustrates another illustrative view of a trailer wherein multiple possible vectors have been projected.

FIG. 5 illustrates another embodiment of the automatic panning system wherein a trailer 4 is a lower trailer than in the previous embodiments. The illustrated trailers herein are merely examples and any form of trailer can be used with the system. FIG. 5 thereby illustrates one advantage in relation to prior art that similar projected vectors 2a, 2b, 2c can be projected for another sort of trailer 4.

Figure 6:
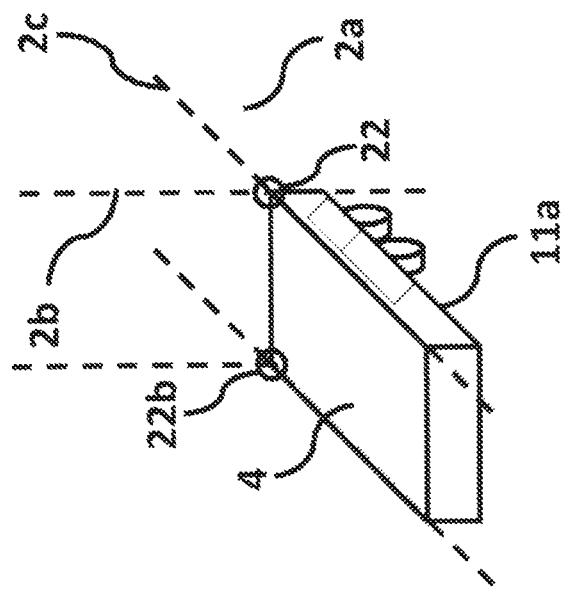
FIG. 6 illustrates one embodiment of image data wherein image data from both sides of the trailer is used for panning.

FIG. 6 illustrates another embodiment of the automatic panning system wherein an interception point 22 is identified and a further interception point 22b at the opposite side of the trailer is identified. The further interception point 22b is in one embodiment another interception point than the interception point 22. The further interception point 22b in combination with the interception point 22 is used to determine if there are any unreasonable results, such as trailer movements that wouldn't be physically possible. An example is a situation wherein the interception point 22 indicates that the trailer is turning to the right and the further interception point 22b indicates that the trailer turns to the left. In one embodiment the interception points 22, 22b can be seen as data points and the automatic panning system gathers multiple data points representing interception points 22, 22b over time. If subsequent data points present results that are not physically possible or in any other way unreasonable the system can filter such results making the panning experience better.

FIG. 6 further illustrates an embodiment wherein the panning system uses a further interception point 22b to filter results that has been affected by disturbance, signal error, or any other form of unwanted information creating a faulty result. Such result can for example occur if there is interference in the system or the image data. A typical example can be reflections or another object visible in the image data. The solution with a further interception point 22 thereby increases the accuracy of the algorithm used by the panning system.

Through using two sides of the trailer, i.e. the detected trailer angle from one side in combination with the detection of the other side the confidence and accuracy of the readings for both sides can be enhanced. In one embodiment the accuracy can be increased further by comparing time stamps for the data from the two sides, wherein data can be different data points representing the interception point 22 and the further interception point 22b.

It shall be noted that in one embodiment when the trailer moves far to one of the sides during a turn the image interception point 22 or 22b might not be present due to that it has moved out of the image data. In the same way the position of the interception point 22 and the position of the further interception point 22b can be compared to determine that the result from both sides is compatible with the result from the other side. For example if the interception point 22 moves in a way that a larger portion of the trailer becomes visible in the captured image data at one side, less of the trailer shall be visible on the other side.

In one embodiment a similar solution by tracking the trailer's previous angle as well as the angle of the steering wheel, alternatively the wheels, and the speed of the vehicle enables that some changes in the trailer's angle can be excluded. In particular when going straight forward only trailer movements that bring the trailer more in line with the vehicle shall be accepted. A more advanced implementation includes predicting the trailer's rotational derivative in particular the derivative of the trailer's angle using properties such as the length of the trailer, the trailer's hitching offset, the distance between the vehicles wheel axles, the vehicles speed, and the steering wheel angle of the vehicle. By estimating the trailer's angle using the image capturing means and a calculated derivative the future trailer angle can be predicted. The detected angles outside a calculated cone, i.e. an imagined cone extending backwards from the image capturing means, of acceptable angles can thus be discarded.

According to one embodiment, the automatic panning system is further adapted to discard interception points outside the calculated cone. According to one embodiment, the automatic panning system is adapted to discard interception points outside the calculate cone when the vectors, 2b, 2c, 2d are used as a reference vector 21. As a result, the automatic panning system avoids panning captured images based on erroneous interception points generated by erroneously identified elongated elements or lines e.g. from shadows of the trailer captured by the image capturing means. As an effect, the image as seen by the operator/driver becomes less jumpy, i.e. avoiding irregular or erratic panning movements which are irritating and less safe as the trailer may occasionally be outside the captured image as viewed by the operator.

According to one embodiment, the trailer angle refers to the angle of the trailer in relation to the cab of a vehicle.

According to one embodiment, the hitching offset is the distance between the rear wheels and the hitching point of the trailer.

According to one embodiment, the calculated cone will have its center at the predicted location, i.e. according to one embodiment, the predicted trailer angle of the trailer. According to one embodiment, the cone width is determined by the parameters used for its calculation. According to one embodiment, the parameters are defined by derivative calculation parameters. According to one embodiment, the parameters are defined by at least one of the derivative calculation parameters. According to one embodiment, the derivation calculation parameters may in turn be calculated or determined. To determine the width of the cone a deviation of the parameters can be used to calculate the longest and shortest distance the trailer might have traversed based on statistical models for the deviation of parameters either individually or collectively. According to one embodiment, the derivation calculation parameters may be predefined by being preset in the automatic panning system 1. According to one embodiment the end point of the cone or the width of the cone is defined by an elongated element or an interception point identified by the automatic panning system which deviation compared to a previous identified elongated element or an interception point is the currently largest deviation still within a predefined threshold. According to one embodiment, the threshold is defining a limit for the speed of movement of the interception point. According to one embodiment, a high speed could indicate erroneous image data.

According to one embodiment, an automatic panning system adapted for a vehicle with an attached trailer 4 is provided, wherein said automatic panning system comprises an image capturing means adapted to capture image data 1 with a view of the trailer 4, wherein the automatic panning system is adapted to analyze the image data 1 to estimate the trailer's angle using the image capturing means and predict the trailer's rotational derivative, in particular the derivative of the trailer's angle, using derivative calculation parameters comprising at least one of the length of the trailer, the trailer's hitching offset, the distance between the vehicles wheel axles, the vehicle's speed, and the steering wheel angle of the vehicle, and in that the automatic panning system further is adapted to use the trailer's angle and the calculated derivative to predict a future trailer angle. According to one embodiment, the derivative calculation parameters comprising the distance between the wheels of the trailer, the distance between the wheels and the hitching point, the steering angle of the front wheels and/or the steering wheel angle, and the speed of the vehicle According to one embodiment, the automatic panning system is adapted to analyze the image data 1 to estimate the trailer's angle whereby estimation comprises or is carried out by estimating the angle between the vector 21, 2b, 2c and the reference vector 21 at the interception point 22 of the reference vector 21 and the vector 2a, 2b.

According to one embodiment, to estimate the trailer's movement, i.e. to predict the trailer rotational derivative, the distance between the wheels of the trailer, the distance between the wheels and the hitching point, the steering angle of the front wheels and/or the steering wheel angle, and the speed of the vehicle are used. According to one embodiment, further, the speed of the vehicle and angle of the wheels are measured continuously to predict the trailer's angle. According to one embodiment, fixed distances inherent to the trailer can either be set before calculations are performed. According to one embodiment, fixed distances can be estimated using an initiation sequence where the speed and wheel angle and/or steering wheel angle are controlled to reach a known state, such as for instance aligning the trailer with the cab wherein the trailer angle is zero, and further controlled to move the trailer using a known speed and wheel angle and/or steering wheel angle and thus calculate the fixed distances of the vehicle using the known speed and wheel angle and/or steering wheel angle as well as the trailer's angle, which is identified using the image capturing means. In particular when the vehicle has been driving straight forward for a few seconds the trailer's position will be known to be directly behind the vehicle. Alternatively, when the steering angle of the front wheels and/or steering wheel angle have been kept constant during driving a sufficient time in e.g. a roundabout the trailers position or angle will be known. In a subsequent turn the steering angle and speed can be measured to provide an accurate calculation for the unknown parameters wheel distance and hitching offset using the measured rotation of the trailer in said turn. This can be repeated at a later turn with different speed and angles to accurately determine the previously unknown parameters. According to one embodiment, the calculation is carried out with an accuracy related to the accuracy of the control of the speed and wheel angle and/or steering wheel angle. According to one embodiment, the automatic panning system is adapted to analyze the image data 1 to estimate the trailer's angle, by or based on that the automatic panning system being adapted to identify at least one elongated element 11a, 11b, 11c, 11d of the trailer 4, project a vector 2a, 2b, 2c in the image data 1 based on said elongated element 11a, 11b, 11c, 11d, establish at least one reference vector 21, and identify an interception point 22 of the reference vector 21 and said projected vector 2a, 2b.

According to one embodiment, a risk of locking on to the wrong or erroneous line or elongated element in the image data, i.e. when projecting vector in the image data 1 based on a false elongated element of the trailer or during establishing the reference vector 21 is overcome. According to one embodiment, for a moving vehicle erroneous lines or elongated elements will not persist and the automatic panning system is adapted to monitor the time since it last detected a line or an elongated element and release the lock of the line or the elongated element after a certain time such as 1 second if it no longer can detect the lone or the elongated element. In practice this will allow the system to lock onto the trailer's line or elongated element efficiently while preventing faulty lines or elongated elements from locking down the system completely. According to one embodiment, the system can further remember the trailer's position at the time of stopping to initiate the system with greater accuracy.

The invention claimed is:

1. An automatic panning system adapted for a vehicle with an attached trailer, wherein said automatic panning system comprises an image capturing means adapted to capture image data with a view of the trailer, wherein the automatic panning system is adapted to analyze the image data to identify at least one elongated element of the trailer, project a vector in the image data based on said elongated element, establish at least one reference vector, and identify an interception point of the reference vector and said projected vector.

2. The automatic panning system according to claim 1, wherein the automatic panning system further is adapted to establish the reference vector such that said identified interception point corresponds to the position of the rear end of the trailer in the captured image data.

3. The automatic panning system according to claim 1, wherein said automatic panning system further is adapted to pan the captured image data based on the identified interception point.

4. The automatic panning system according to claim 3, wherein the automatic panning system further is adapted to, in real time, present the panned captured image data to an operator of the vehicle.

5. The automatic panning system according to claim 1, wherein said identified elongated element is selected from any one of a longitudinal lower edge of the trailer, a longitudinal top edge of the trailer, a vertical rear edge of the trailer, and a printed element on the trailer.

6. The automatic panning system according to claim 1, wherein the reference vector is determined based on at least one distinct point in a background of the captured image data.

7. The automatic panning system according to claim 1, wherein the reference vector is a horizontal reference vector.

8. The automatic panning system according to claim 1, wherein said automatic panning system further comprises a display, a memory, and a processor unit.

9. The automatic panning system according to claim 1, wherein the system is adapted to identify a further interception point on an opposite side of the trailer from the interception point, and establish if the further interception point is in a position that based on at least one physical property of the trailer, a previous position of the trailer, and the interception point, is possible.

10. The automatic panning system according to claim 1, wherein the automatic panning system further is adapted to calculate the vehicle speed as a function of a velocity and wheels' angle to predict a movement of the trailer.

11. The automatic panning system according to claim 1, wherein the automatic panning system is adapted to analyze the image data to estimate the attached trailer's angle using the image capturing means and predict the trailer's rotational derivative, in particular a derivative of the trailer's angle, using derivate calculation parameters comprising at least one of a length of the trailer, the trailer's hitching offset, a distance between the vehicle's wheel axles, the vehicle's speed, and a steering wheel angle of the vehicle, wherein the automatic panning system is further adapted to use the trailer's angle and the calculated derivative to predict a future trailer angle.

12. The automatic panning system according to claim 1, wherein the automatic panning system is adapted to analyze the image data to estimate the attached trailer's angle using the image capturing means and predict the trailer's rotational derivative, in particular a derivative of the trailer's angle, using derivative calculation parameters comprising a distance between the trailer's wheels, a distance between the trailer's wheels and the trailer's hitching point, a steering angle of the trailer's front wheels and/or the trailer's steering wheel angle, and a speed of the vehicle, wherein the automatic panning system is further adapted to use the trailer's angle and the calculated derivative to predict a future trailer angle.

13. The automatic panning system according to claim 11, wherein the automatic panning system is further adapted to calculate an imagined cone having its center at the predicted trailer angle of the trailer.

14. The automatic panning system according to claim 13, wherein the automatic panning system is further adapted to discard interception points outside the imagined cone.

15. Method for use in an automatic panning system adapted to be arranged in a vehicle with an attached trailer, wherein said automatic panning system is configured to capture image data with a view of the trailer attached to the vehicle, the method comprising the steps of:
    capturing image data,
    analyzing the image data to identify at least one elongated element of the trailer,
    establishing at least one reference vector,
    projecting a vector of the identified elongated element, and
    identifying an interception point between the projected vector based on the elongated element and the reference vector.

16. The method according to claim 15, wherein the horizontal reference is established such that said interception point corresponds to a position of a rear end of the trailer in the captured image data.

17. The method according to claim 15, wherein the method further comprises the step of:
    panning said captured imaged data based on the interception point.

18. The method according to claim 15, wherein said identified elongated element is selected from any one of a longitudinal lower edge of the trailer, a longitudinal top edge of the trailer, a vertical rear edge of the trailer, and a printed element on the trailer.

19. The method according to claim 15, wherein said reference vector is a horizontal reference vector.

20. The method according to claim 15, wherein the reference vector is determined based on at least one distinct point in a background of the captured image data.

21. The method according to claim 15, wherein the method further comprises the steps of:
    determining a speed of the vehicle,
    determining a processing time for the steps according to claim 15,
    determining a processing time threshold based on said speed of the vehicle,
    determining whether said processing time threshold is exceeded, and
    panning the captured image data based on vehicle sensor data.

22. The method according to claim 15, the method further comprises the steps of:
    estimating the attached trailer's angle using the image capturing means and predicting the trailer's rotational derivative, in particular a derivative of the trailer's angle, using derivative calculation parameters comprising at least one of a length of the trailer, the trailer's hitching offset, a distance between the vehicle's wheel axles, the vehicle's speed, and a steering wheel angle of the vehicle, and
    using the trailer's angle and the calculated derivative to predict a future trailer angle.

23. The method according to claim 15, the method further comprises the steps of:
    estimating the attached trailer's angle using the image capturing means and predicting the trailer's rotational derivative, in particular a derivative of the trailer's angle, using derivative calculation parameters comprising a distance between the trailer's wheels, a distance between the trailer's wheels and the trailer's hitching point, a steering angle of the vehicle's front wheels and/or a steering wheel angle, and a speed of the vehicle, and using the trailer's angle and the calculated derivative to predict a future trailer angle.

\* \* \* \* \*